United States Patent
Johnson et al.

(10) Patent No.: US 10,714,133 B1
(45) Date of Patent: Jul. 14, 2020

(54) DATA STORAGE DEVICE CAPABLE OF OVERRIDING A SERVO COMMAND TO AVOID AN OVERCURRENT CONDITION

(71) Applicant: Western Digital Technologies, Inc., San Jose, CA (US)

(72) Inventors: Brian Johnson, Laguna Hills, CA (US); Ryan Mayo, Aliso Viejo, CA (US); Jaesoo Byoun, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/583,832

(22) Filed: Sep. 26, 2019

(51) Int. Cl.
  *G11B 5/55* (2006.01)
  *G11B 5/596* (2006.01)

(52) U.S. Cl.
  CPC ........ *G11B 5/5547* (2013.01); *G11B 5/59688* (2013.01); *G11B 5/556* (2013.01); *G11B 5/5526* (2013.01); *G11B 5/5573* (2013.01)

(58) Field of Classification Search
  None
  See application file for complete search history.

(56) References Cited

U.S. PATENT DOCUMENTS

| | | | | |
|---|---|---|---|---|
| 5,412,519 A * | 5/1995 | Buettner | ................ | G11B 19/00 360/73.03 |
| 5,838,515 A * | 11/1998 | Mortazavi | .............. | G11B 5/022 360/78.12 |
| 6,282,046 B1 * | 8/2001 | Houston | ................ | G11B 19/14 360/69 |
| 6,285,521 B1 * | 9/2001 | Hussein | ................ | G11B 15/46 360/73.03 |
| 6,369,972 B1 | 4/2002 | Codilian et al. | | |
| 6,717,763 B2 * | 4/2004 | Ottesen | ................ | G11B 5/5521 360/69 |
| 7,006,320 B1 * | 2/2006 | Bennett | ................ | G11B 19/20 360/70 |
| 7,035,032 B2 * | 4/2006 | Tanner | ................ | G11B 5/5547 360/69 |
| 7,333,292 B2 | 2/2008 | Chu et al. | | |
| 7,362,565 B2 | 4/2008 | Imblum | | |
| 7,453,680 B2 | 11/2008 | Hallak et al. | | |
| 7,531,975 B1 * | 5/2009 | Rana | ...................... | G11B 19/28 318/254.1 |
| 8,369,092 B2 | 2/2013 | Atkins et al. | | |
| 9,093,160 B1 | 7/2015 | Ellis et al. | | |
| 9,424,868 B1 | 8/2016 | Nicholls et al. | | |
| 9,437,231 B1 * | 9/2016 | Ferris | ................... | G11B 5/5582 |
| 9,940,958 B1 * | 4/2018 | Kiyonaga | .............. | G11B 21/12 |
| 10,014,018 B1 | 7/2018 | Kiyonaga et al. | | |
| 10,176,840 B1 | 1/2019 | Johnson et al. | | |
| 10,504,553 B1 * | 12/2019 | Byoun | ................ | G11B 21/106 |
| 2013/0080680 A1 | 3/2013 | Chu | | |
| 2013/0290611 A1 | 10/2013 | Biederman et al. | | |
| 2016/0270250 A1 | 9/2016 | Chen et al. | | |
| 2017/0060152 A1 | 3/2017 | Martini | | |

* cited by examiner

*Primary Examiner* — Tan X Dinh

(57) ABSTRACT

A data storage device is disclosed comprising a first actuator configured to actuate a head over a disk, a second actuator configured to rotate the disk, a first control circuit configured to generate a servo command, and a second control circuit configured to receive the servo command from the first control circuit, control the first actuator or the second actuator using the servo command, and override the servo command to avoid an overcurrent condition.

20 Claims, 7 Drawing Sheets

US 10,714,133 B1

DATA STORAGE DEVICE CAPABLE OF OVERRIDING A SERVO COMMAND TO AVOID AN OVERCURRENT CONDITION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors 6O-6N recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
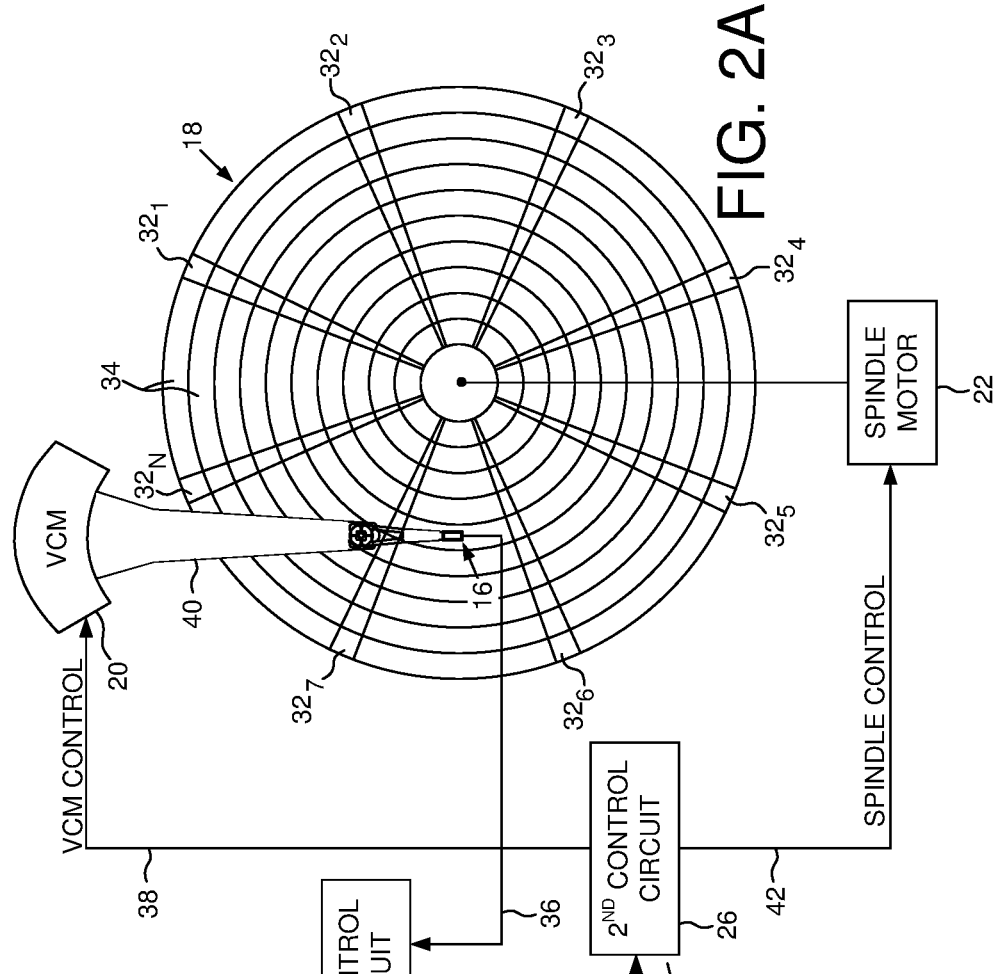
FIG. 2A shows a data storage device in the form of a disk drive according to an embodiment comprising a head actuated over a disk, a first control circuit for executing a servo control algorithm, and a second control circuit for generating control signals applied to a VCM actuator and a spindle motor.
Figure 2B:
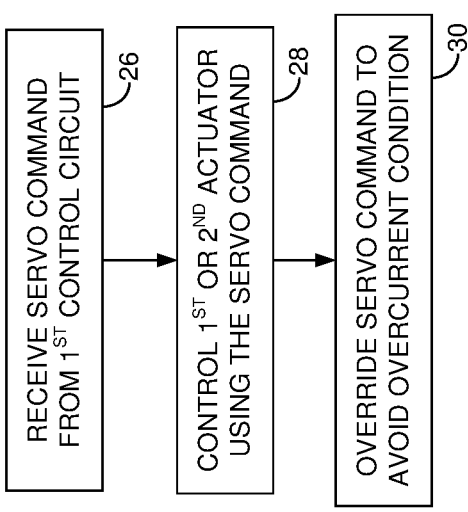
FIG. 2B is a flow diagram according to an embodiment executed by the second control circuit wherein a servo command received from the first control circuit is overridden when an overcurrent condition is detected.

FIG. 2A shows a data storage device in the form of a disk drive according to an embodiment comprising a head 16 actuated over a disk 18, a first actuator 20 (e.g., shown as VCM) configured to actuate the head 16 over the disk 18, a second actuator 22 (e.g., shown as spindle motor) configured to rotate the disk 18, a first control circuit 24 configured to generate a servo command, and a second control circuit 26 configured to execute the flow diagram of FIG. 2B. The servo command is received from the first control circuit (block 26), the first actuator or the second actuator is controlled using the servo command (block 28), and the servo command is overridden to avoid an overcurrent condition (block 30).

Figure 1:
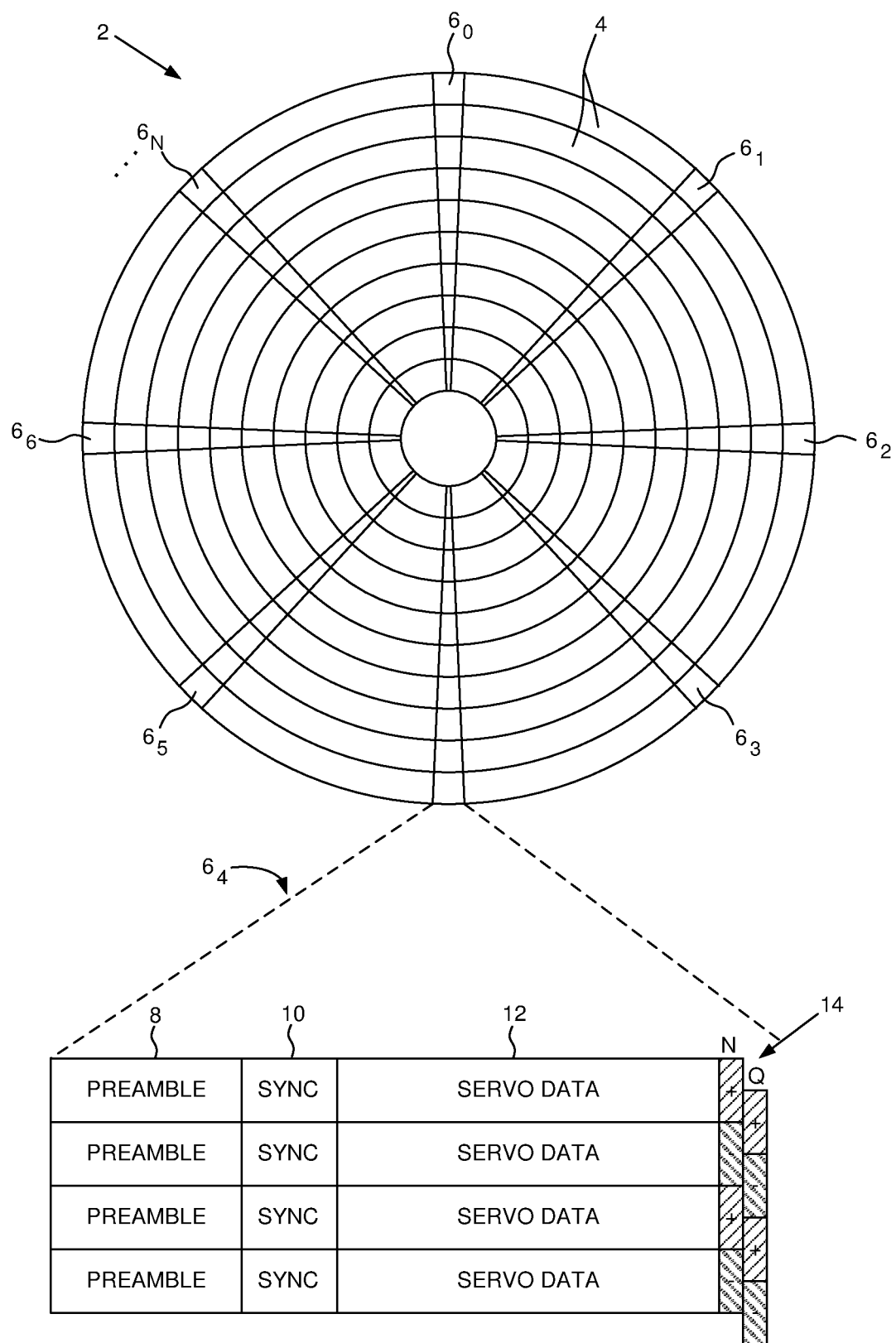
FIG. 1 shows a prior art disk format comprising a plurality of servo tracks defined by servo sectors.

In the embodiment of FIG. 2A, the disk 18 comprises a plurality of servo sectors $32_1$-$32_N$ that define a plurality of servo tracks, wherein data tracks 34 are defined relative to the servo tracks at the same or different radial density. The first control circuit 24 processes a read signal 36 emanating from the head 16 to demodulate the servo sectors and generate a position error signal (PES) representing an error between the actual position of the head and a target position relative to a target track. A servo control system in the first control circuit 24 filters the PES using a suitable compensation filter to generate a servo command transmitted to the second control circuit 26. In response to the servo command, the second control circuit 26 generates a control signal 38 applied to the first actuator (e.g., VCM 20 which rotates an actuator arm 40 about a pivot in order to actuate the head radially over the disk surface in a direction that reduces the PES). In one embodiment, the head 16 may be actuated over the disk 18 based on the PES using one or more secondary actuators, for example, a microactuator that actuates a suspension coupling a head slider to the actuator arm 40, or a microactuator that actuates the head slider relative to the suspension (e.g., using a thermal actuator, piezoelectric actuator, etc.). The servo sectors $32_1$-$32_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, the first control circuit 24 also generates and transmits a servo command to the second control circuit 26 for controlling the second actuator (e.g., spindle motor 22). The servo command may be generated based on a difference between a measured rotation speed and a target rotation speed, wherein the measured rotation speed may be generated in any suitable manner, for example, by monitoring the back electromotive force (BEMF) voltage of the spindle motor, or by reading the servo sectors on the disk. In response to the servo command, the second control circuit 26 generates a control signal 42 applied to the second actuator to maintain the measured rotation speed at the target rotation speed.

Figure 3A:
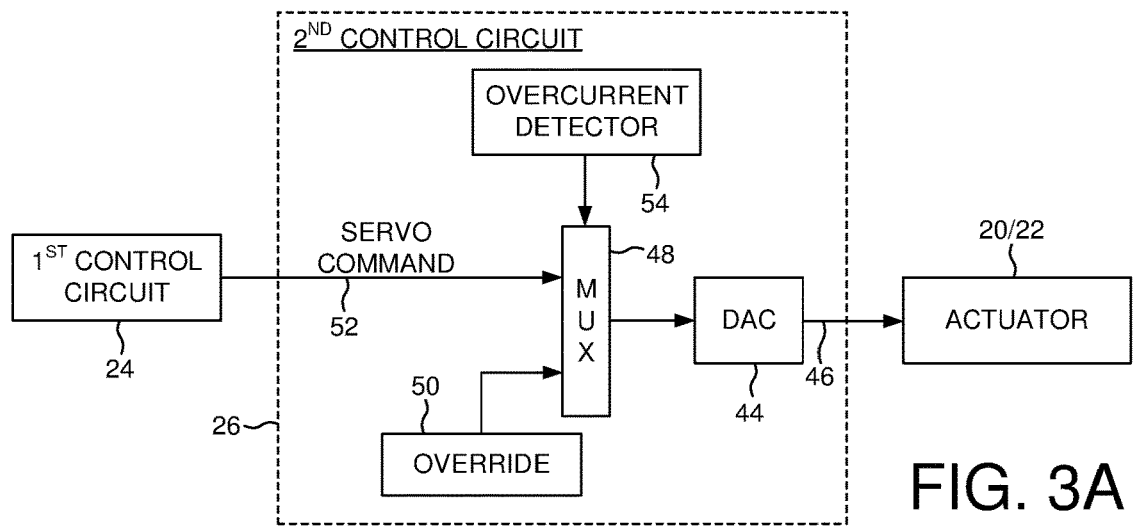
FIG. 3A shows an embodiment wherein the second control circuit detects the overcurrent condition.

FIG. 3A shows an embodiment wherein the second control circuit 26 comprises an digital-to-analog converter (DAC) 44 configured to convert the servo command 52 received from the first control circuit 24 into an analog control signal 46 applied to the first actuator 20 or the second actuator 22. When an overcurrent condition is detected, the servo command is overridden by applying an override command to the DAC 44. In the embodiment of FIG. 3A, the servo command is overridden by configuring a multiplexer 48 to output an override command 50 instead of the servo command 52. In one embodiment described below, the override command 50 may be applied to the DAC 44 when the override command 50 is less than the servo command 52, thereby reducing the current draw of the actuator so as to avoid the overcurrent condition.

Also in the embodiment of FIG. 3A, the second control circuit 26 comprises an overcurrent detector 54 for detecting the overcurrent condition and for configuring the multiplexer 48. In this embodiment, the second control circuit 26 may override the servo command 52 in an operation autonomous from the first control circuit 24, thereby providing a fast response to the detected overcurrent condition. The overcurrent detector 54 may comprise any suitable circuitry, such as a comparator for comparing an output of a voltage detector to a threshold, or comparing the output of a current detector to a threshold. In on embodiment, the overcurrent detector may implement hysteresis such that the overcurrent condition may remain detected until a detected voltage rises above a hysteretic threshold, or a detected current falls below a hysteretic threshold.

Figure 3B:
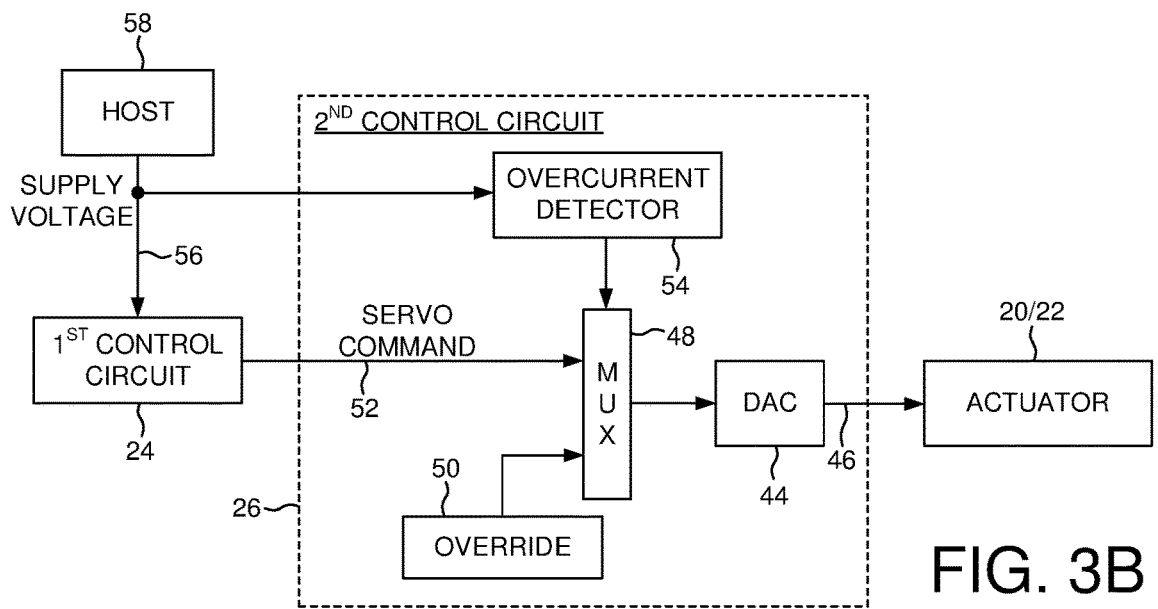
FIG. 3B shows an embodiment wherein the overcurrent condition occurs when the data storage device nears a current limit of a supply voltage received from a host.

In an embodiment shown in FIG. 3B, the data storage device further comprises an input configured to receive a supply voltage 56 from a host 58, wherein when the data storage device nears a current limit of the supply voltage 56, the second control circuit 26 is configured to override the servo command 52. In the embodiment of FIG. 3B, an overcurrent detector 54 in the second control circuit 26 detects when the data storage device nears a current limit of the supply voltage 56. For example, in one embodiment the host 58 may comprise a suitable electric fuse (eFuse) that may "open" when the current limit of the supply voltage 56 is reached. When this overcurrent condition begins to occur, the resistance of the eFuse increases, thereby causing the supply voltage 56 to decrease. Accordingly in one embodiment, the overcurrent detector 54 may detect an overcurrent condition when the supply voltage 56 falls below a predetermined threshold. In another embodiment, the overcurrent detector 54 may detect an overcurrent condition when a current flowing from the supply voltage 56 exceeds a threshold indicating the data storage device is nearing the current limit of the supply voltage 56. In one embodiment when the overcurrent condition is detected, the override command 50 prevents the data storage device from reaching the current limit of the supply voltage 56, thereby avoiding the latency associated with executing an emergency power failure operation, such as unloading the heads from the disk or spinning down the disk.

Figure 3C:
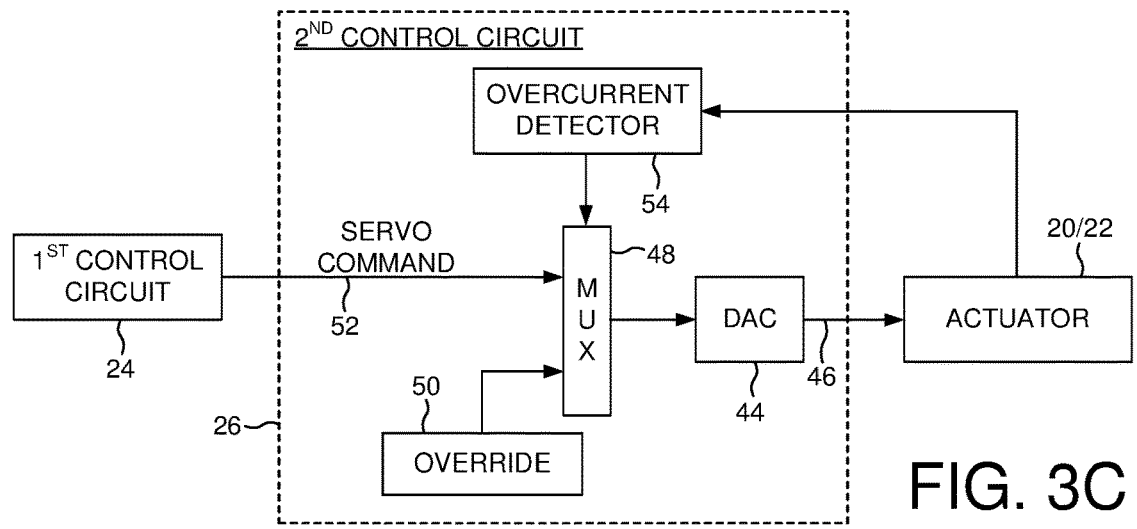
FIG. 3C shows an embodiment wherein the overcurrent condition occurs when an actuator (e.g., VCM or spindle motor) nears a current limit.

FIG. 3C shows an embodiment wherein the overcurrent condition may be detected when a component of the data storage device (e.g., the first or second actuator 20/22) nears a current limit. In this embodiment, the override command 50 may prevent damaging the component, such as damaging the coil of the VCM 20, the coils of the spindle motor 22, the attendant driving circuitry (e.g., driving transistors), etc.

Figure 3D:
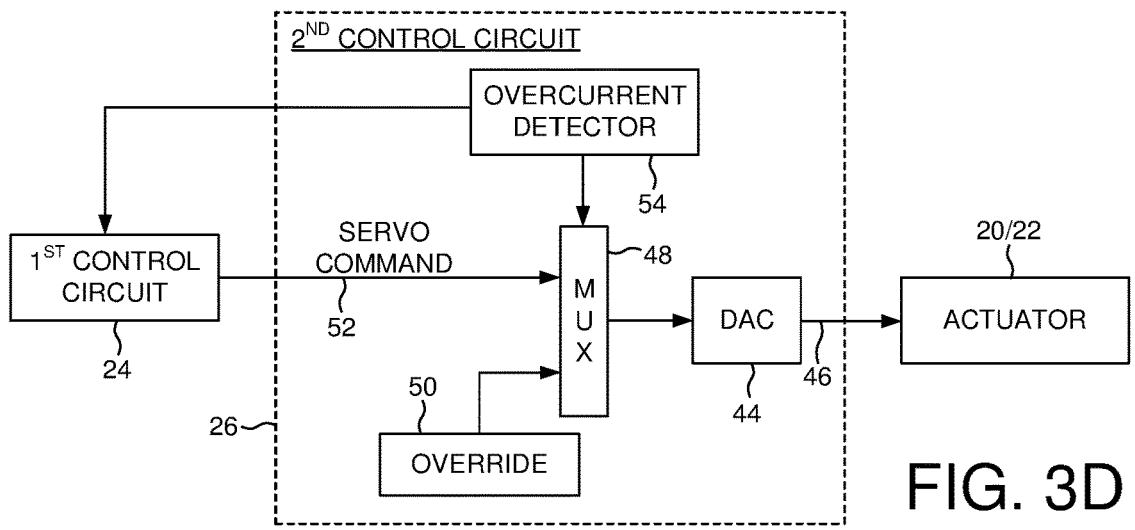
FIG. 3D shows an embodiment wherein the second control circuit notifies the first control circuit when the overcurrent condition is detected.

FIG. 3D shows an embodiment wherein when the second control circuit 26 detects an overcurrent condition, a notification of the overcurrent condition may be transmitted to the first control circuit 24. The first control circuit 24 may perform any suitable operation in response to the detected overcurrent condition, such as aborting or modifying a current seek operation, or modifying the seek profiles of future seek operations. In another embodiment, the first control circuit 24 may adjust the operation of the spindle motor 22, such as reducing the target rotation speed. In one embodiment, the first control circuit 24 may modify operation of the data storage device until the overcurrent condition is no longer being detected by the second control circuit 26.

Figure 3E:
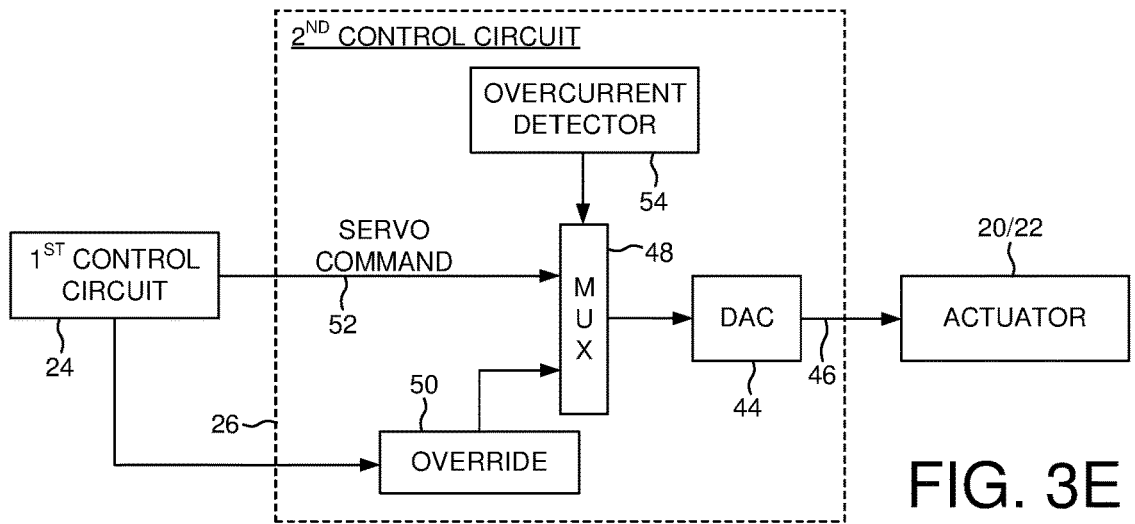
FIG. 3E shows an embodiment wherein the first control circuit configures an override command of the second control circuit.

FIG. 3E shows an embodiment wherein the first control circuit 24 may configure the second control circuit 26 with a suitable override command 50. For example, in one embodiment the override command 50 may be a predetermined value that corresponds with a modified servo algorithm of the first control circuit 24. In this manner, when an overcurrent condition causes the servo command 52 to be overridden, the response of the first control circuit 24 may be based on the preconfigured override command 50 transmitted to the second control circuit 26. In one embodiment, the override command 50 preconfigured by the first control circuit 24 may decrease the servo command 52 by a predetermined offset, for example, by subtracting an offset value from the servo command 52.

Figure 3F:
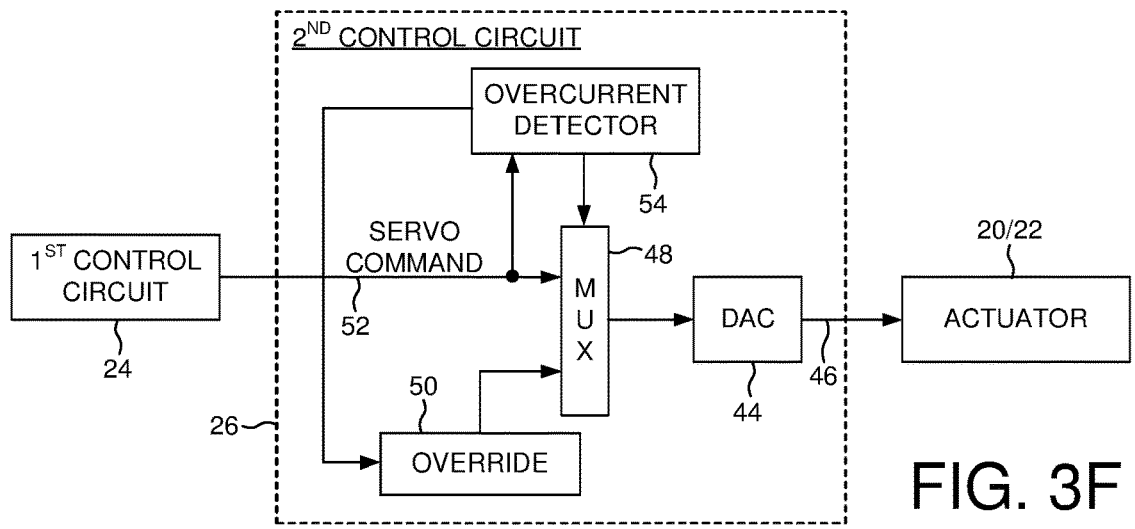
FIG. 3F shows an embodiment wherein the second control circuit adjusts an override command in response to the detected overcurrent condition.

FIG. 3F shows an embodiment wherein the second control circuit 26 may configure the override command 50 in response to a detected overcurrent condition. In one embodiment the second control circuit 26 may configure the override command 50 independent of the servo command 52, and in another embodiment, the second control circuit 26 may generate the override command 50 by decreasing the servo command 52 (e.g., by subtracting an offset value from the servo command 52). In yet another embodiment, if the second control circuit 26 receives a subsequent servo command 52 from the first control circuit 24 that is below the current override command, then the second control circuit 26 may apply the servo command 52 to the DAC 44 rather than the override command 50.

Figure 4:
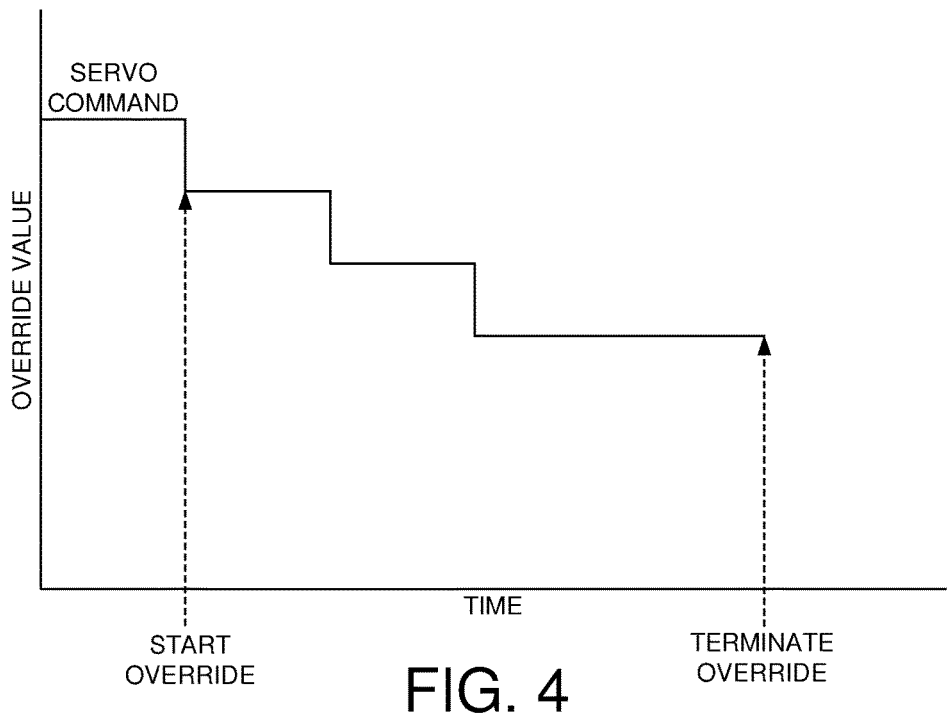
FIG. 4 shows an embodiment wherein the override command is step decreased open loop during the overcurrent condition over a predetermined interval.

FIG. 4 shows an embodiment wherein the override command 50 may be generated as a stepped-down value, for example, stepped-down open loop from the value of the current servo command 52 when the overcurrent condition is detected. In one embodiment, stepping down the current servo command 52 as shown in FIG. 4 reduces the transient injected into the servo control loop (executed by the first control circuit 24) due to overriding the servo command 52. In another embodiment shown in FIG. 4, the servo command 52 may be overridden for a predetermined interval, after which the override is terminated. In one embodiment, terminating the override may trigger an emergency power failure operation in the event the detected overcurrent condition (e.g., based on the supply voltage falling below a threshold) may be due to a power failure rather than an overcurrent condition.

Figure 5A:
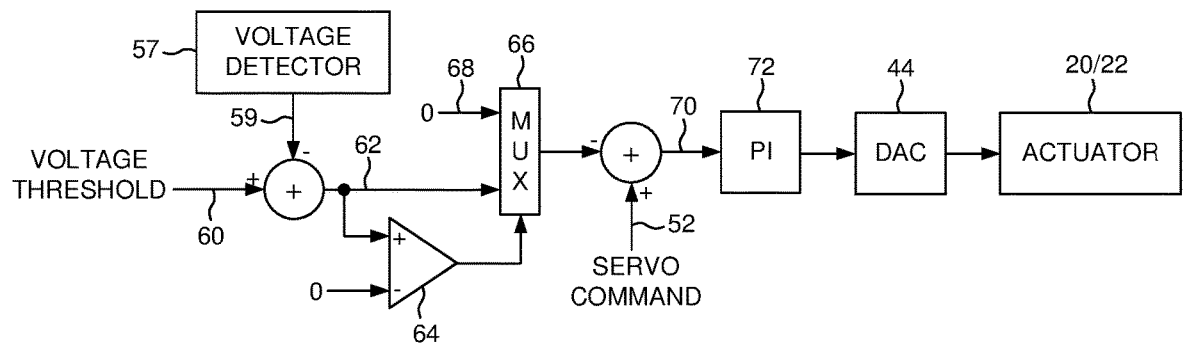
FIG. 5A shows an embodiment wherein the override command is adjusted closed loop relative to a voltage threshold of the overcurrent condition.

In another embodiment, the second control circuit 26 may adjust the override command 50 using closed loop control. FIG. 5A shows an example of this embodiment, wherein an overcurrent condition is detected when a voltage (e.g., supply voltage) falls below a target voltage threshold due, for example, to the resistance of an eFuse increasing as the data storage device nears a current limit of a supply voltage. In this embodiment, the second control circuit 26 comprises a voltage detector 57 outputting a detected voltage 59 that is subtracted from a target voltage 60 to generate a voltage error signal 62. When the voltage error signal 62 is less than zero, comparator 64 configures a multiplexer 66 to output a zero error value 68. When the voltage error signal 62 is greater than zero, comparator 64 configures the multiplexer 66 to output the voltage error signal 62 which is subtracted from the servo command 52. The reduced servo command 70 is filtered using a suitable compensation filter 72 the output of which is applied to the DAC 44. The closed loop control of FIG. 5A operates to maintain the detected voltage 59 at or above the target voltage threshold 60, thereby avoiding the undesirable effects of the overcurrent condition.

Figure 5B:
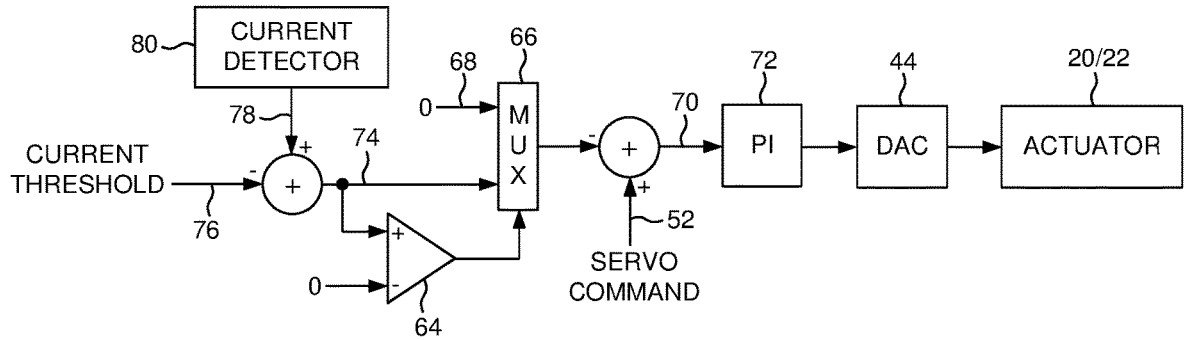
FIG. 5B shows an embodiment wherein the override command is adjusted closed loop relative to a current threshold of the overcurrent condition.

FIG. 5B shows an embodiment wherein an overcurrent condition is detected when a detected current of the data storage device rises above a target current threshold due, for example, to the data storage device drawing excessive current from a supply voltage, or a component of the data storage device nearing a current limit. In this embodiment, the closed loop control operates based on a current error signal 74 generated by subtracting a target current threshold 76 from a detected current 78 generated by a suitable current detector 80. The closed loop control of FIG. 5B operates to maintain the detected current 78 at or below the target current threshold 76, thereby avoiding the undesirable effects of the overcurrent condition.

In one embodiment when the second control circuit 26 overrides the servo command 52 to avoid an overcurrent condition, the resulting degradation of the servo control algorithm implemented by the first control circuit 24 may prevent the completion of a current seek operation within a desired seek time. If the seek is not completed in time (i.e., if the head reaches the target track after the target data sector), there may be an undesirable decrease in throughput due to the latency of waiting for the disk to complete a revolution. Accordingly in one embodiment, the first control circuit 24 may detect when a current seek operation will likely fail due to the second control circuit 26 overriding the servo command 52 during an overcurrent condition. Rather than complete the current seek operation, the first control circuit 24 may abort the current seek operation and initiate a new seek operation for a different access command. For example, the first control circuit 24 may execute a suitable rotational position optimization (RPO) algorithm with less aggressive seek profiles in order to initiate a new seek operation that is more likely to succeed under the current operating conditions.

Figure 6:
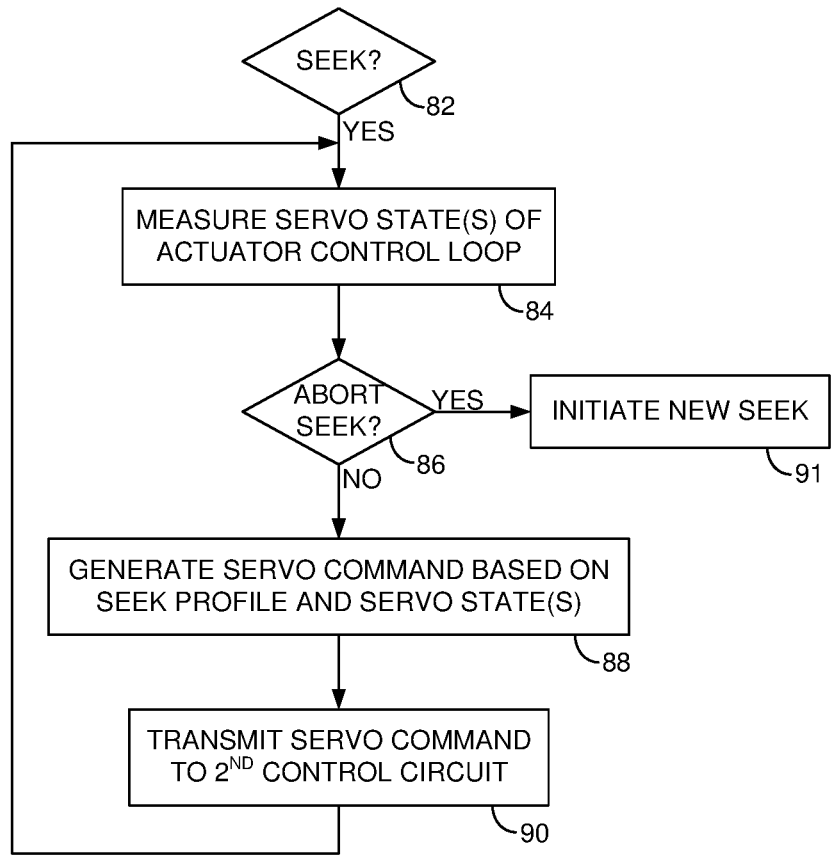
FIG. 6 is a flow diagram according to an embodiment wherein when seeking the head over the disk, the first control circuit may abort the seek due to the overcurrent condition.
Figure 7:
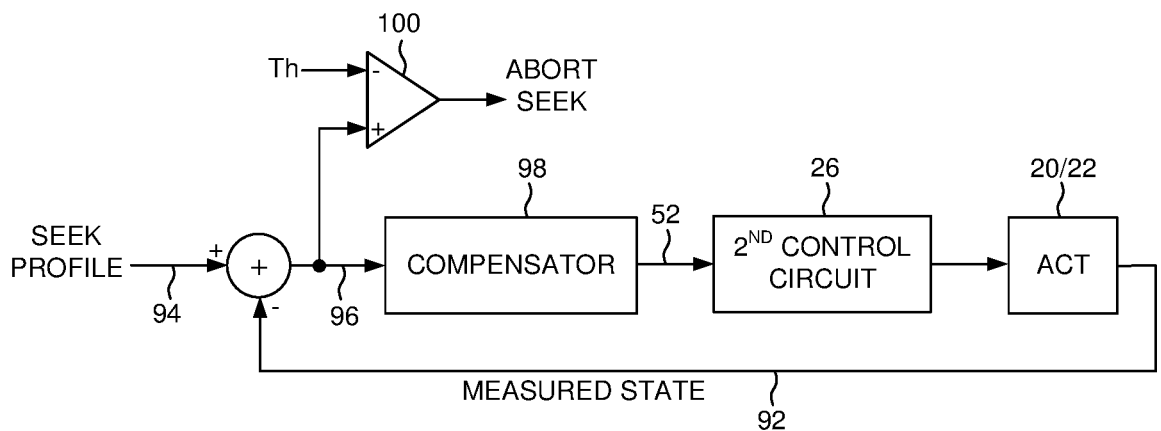
FIG. 7 shows an embodiment wherein the first control circuit may abort a seek operation when a position error signal (PES) exceeds a threshold.

An example of this embodiment is shown in the flow diagram of FIG. 6, wherein during a current seek operation (block 82), the first control circuit 24 measures one or more servo states of an actuator control loop (block 84). When the measured servo states are within an acceptable tolerance (block 86), the first control circuit 24 generates a servo command based on the current seek profile and the measured servo states (block 88) and transmits the servo command to the second control circuit (block 90). When the measured servo states are outside the acceptable tolerance, indicating the current seek is likely to fail, the current seek is aborted (block 86) and a new seek is initiated (block 91). FIG. 7 shows an example of a closed loop servo control algorithm implemented by the first control circuit 24. A measured state 92 of the actuator 20/22 (e.g., position, velocity, etc.) is subtracted from a target state of a seek profile 94 to generate a state error signal 96. The state error signal 96 is filtered with a suitable servo compensator 98 to generate the servo command 52 transmitted to the second control circuit 26. When the state error signal 96 exceeds a threshold at comparator 100, the current seek operation is aborted. Other embodiments may implement more sophisticated techniques for determining when to abort a current seek operation, such as detecting when a state error exceeds a threshold for a predetermined interval, evaluating multiple state error signals, predicting future state error signals, etc.

Figure 8:
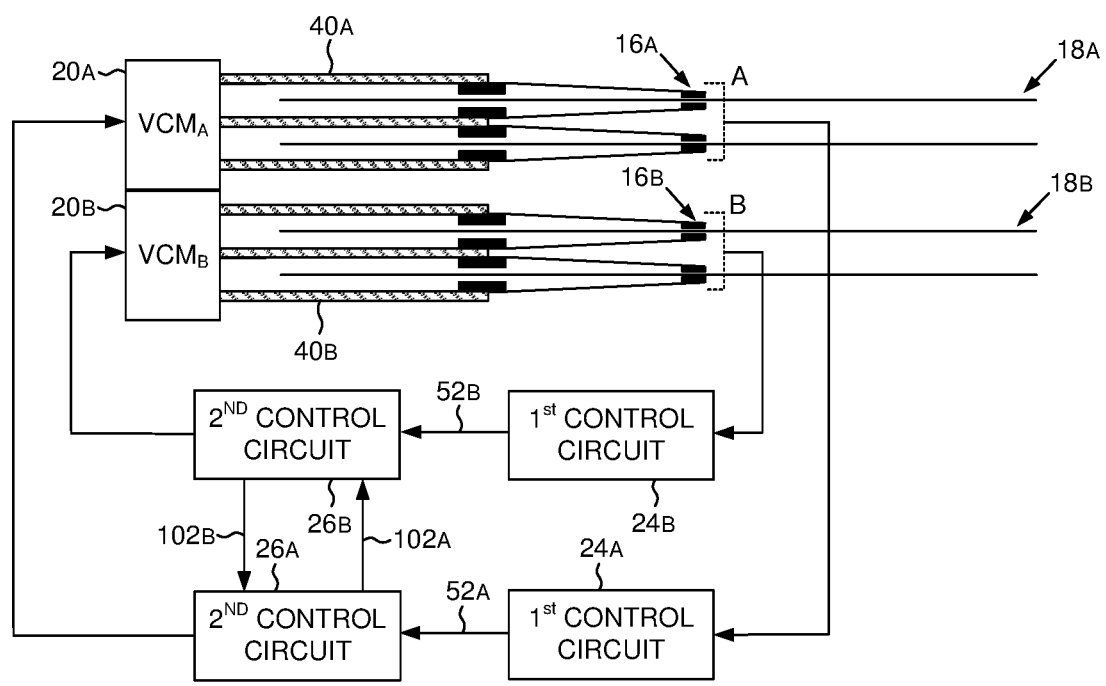
FIG. 8 shows an embodiment wherein the data storage device comprises multiple VCMs for actuating respective actuator arms using respective control circuits, wherein the control circuits transmit overcurrent sync signals in order to synchronize the control circuits when an over current condition is detected.

FIG. 8 shows an embodiment wherein the data storage device may comprise multiple actuators (e.g., VCMA 20A or VCMB 20B) each configured to rotate respective actuator arms 40A and 40B about a pivot, thereby independently actuating multiple sets of heads over respective disk surfaces. In this embodiment, each actuator 20A and 20B is controlled by a respective second control circuit 26A and 26B that receive a respective servo command 52A and 52B from a respective first control circuit 24A and 24B. In one embodiment, either of the second control circuits 26A or 26B may detect an overcurrent condition, for example, during a concurrent seek operation of both actuators 20A and 20B. In the embodiment of FIG. 8, each second control circuit 26A and 26B generates a respective overcurrent sync signal 102A and 102B that is transmitted between the control circuits whenever either control circuit detects an overcurrent condition. In this manner, a synchronized response may be executed by both second control circuits 26A and 26B, such as by overriding the servo commands 52A and 52B transmitted by the first control circuits 24A and 24B. In one embodiment, the synchronized response effectively balances the reduction of the current draw by both actuators 20A and 20B so there is a balanced degradation in the concurrent seek operations. In another embodiment, the first control circuits 24A and 24B may configure a different override response for each of the second control circuits 26A and 26B, for example, when one of the actuators is assigned a higher priority over the other actuator.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI) circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head;
   a first actuator configured to actuate the head over the disk;
   a second actuator configured to rotate the disk;
   a first control circuit configured to generate a servo command; and
   a second control circuit configured to:
      receive the servo command from the first control circuit;
      control the first actuator or the second actuator using the servo command; and
      override the servo command to avoid an overcurrent condition.

2. The data storage device as recited in claim 1, wherein the second control circuit comprises a digital-to-analog converter (DAC) and the second control circuit is further configured to:
   apply the servo command to the DAC to generate an analog control signal;
   apply the analog control signal to the first actuator or the second actuator; and
   override the servo command by applying an override command to the DAC.

3. The data storage device as recited in claim 1, further comprising an input configured to receive a supply voltage from a host, wherein when the data storage device nears a current limit of the supply voltage, the second control circuit is configured to override the servo command.

4. The data storage device as recited in claim 3, wherein the second control circuit is further configured to detect when the data storage device nears the current limit of the supply voltage.

5. The data storage device as recited in claim 4, wherein the second control circuit is further configured to notify the first control circuit when the servo command has been overridden.

6. The data storage device as recited in claim 1, wherein the first control circuit is further configured to:
   seek the head over the disk during a seek operation; and
   abort the seek operation due to the second control circuit overriding the servo command.

7. The data storage device as recited in claim 6, wherein the first control circuit is further configured to:
   receive a notification from the second control circuit when the second control circuit overrides the servo command; and
   abort the seek operation in response to the notification.

8. The data storage device as recited in claim 6, wherein the first control circuit is further configured to:
   monitor at least one servo state of the first actuator or the second actuator; and
   abort the seek operation based on the monitored servo state.

9. The data storage device as recited in claim 1, wherein the second control circuit is further configured to:
   detect when the first actuator or the second actuator nears a current limit; and
   override the servo command to prevent the first actuator or the second actuator from reaching the current limit.

10. Control circuitry comprising a digital-to-analog converter (DAC), wherein the control circuitry is configured to:
    receive a servo command from a servo control circuit;
    apply the servo command to the DAC to generate an analog control signal;
    apply the analog control signal to a first actuator configured to actuate a head over a disk or to a second actuator configured to rotate the disk; and
    override the servo command by applying an override command to the DAC to avoid an overcurrent condition.

11. The control circuitry as recited in claim 10, further comprising an input configured to receive a supply voltage from a host, wherein the control circuitry is further configured to override the servo command in order to avoid a current limit of the supply voltage.

12. The control circuitry as recited in claim 11, wherein the control circuitry is further configured to detect when the supply voltage is nearing the current limit.

13. The control circuitry as recited in claim 12, wherein the control circuitry is further configured to notify the servo control circuit when the servo command has been overridden.

14. The control circuitry as recited in claim 10, wherein the control circuitry is further configured to:
- detect when the first actuator or the second actuator nears a current limit; and
- override the servo command to prevent the first actuator or the second actuator from reaching the current limit.

15. The control circuitry as recited in claim 10, wherein the control circuitry is further configured to:
- override the servo command for a predetermined interval; and
- after the predetermined interval, terminate the override.

16. The control circuitry as recited in claim 10, wherein the control circuitry is further configured to decrease the override command open-loop over a predetermined interval.

17. The control circuitry as recited in claim 10, wherein the control circuitry is further configured to adjust the override command using a closed loop control based on least one of a target current or a target voltage of the control circuitry.

18. The control circuitry as recited in claim 10, wherein the control circuitry is further configured to:
- measure at least one of a load current or a load voltage of the control circuitry; and
- terminate the override based on at least one of the measured load current or the measured load voltage.

19. The control circuitry as recited in claim 18, wherein the control circuitry is further configured to terminate the override when at least one of the measured load current rises above a threshold or the measured load voltage falls below a threshold.

20. Control circuitry comprising:
- a means for receiving a servo command from a servo control circuit;
- a means for generating an analog control signal in response to the servo command;
- a means for applying the analog control signal to a first actuator configured to actuate a head over a disk or to a second actuator configured to rotate the disk; and
- a means for overriding the servo command to avoid an overcurrent condition.

* * * * *